United States Patent
Engels et al.

(10) Patent No.: US 10,501,111 B2
(45) Date of Patent: Dec. 10, 2019

(54) STEERING SYSTEM FOR A STEERABLE VEHICLE

(71) Applicants: Ford Global Technologies, LLC, Dearborn, MI (US); ThyssenKrupp Presta Aktiengesellschaft, Eschen (LI)

(72) Inventors: Frank Peter Engels, Solingen (DE); Kristof Polmans, Tarrenz (AT)

(73) Assignees: Ford Global Technologies, LLC, Dearborn, MI (US); ThyssenKrupp Presta Aktiengesellschaft, Eschen (LI)

( * ) Notice: Subject to any disclaimer, the term of this patent is extended or adjusted under 35 U.S.C. 154(b) by 46 days.

(21) Appl. No.: 15/461,966

(22) Filed: Mar. 17, 2017

(65) Prior Publication Data

US 2017/0267275 A1 Sep. 21, 2017

(30) Foreign Application Priority Data

Mar. 18, 2016 (DE) .......................... 10 2016 204 560

(51) Int. Cl.
- *B62D 5/00* (2006.01)
- *B62D 5/04* (2006.01)
- *B62D 7/14* (2006.01)

(52) U.S. Cl.
CPC ............ *B62D 5/003* (2013.01); *B62D 5/001* (2013.01); *B62D 5/0484* (2013.01); *B62D 7/148* (2013.01)

(58) Field of Classification Search
CPC .............................. B62D 7/1509; B62D 5/003
See application file for complete search history.

(56) References Cited

U.S. PATENT DOCUMENTS

| | | | |
|---|---|---|---|
| 7,021,416 B2 | 4/2006 | Kapaan et al. | |
| 7,866,434 B2 | 1/2011 | Shiino et al. | |
| 9,039,015 B2 * | 5/2015 | Balandin | B60G 21/007 180/411 |
| 2008/0149412 A1 | 6/2008 | Osanai et al. | |
| 2012/0043159 A1 * | 2/2012 | Clark | B62D 7/1509 182/69.6 |
| 2017/0144694 A1 * | 5/2017 | Stangl | B62D 7/09 |

FOREIGN PATENT DOCUMENTS

| | | | | |
|---|---|---|---|---|
| DE | 19902556 A1 * | 7/2000 | | B62D 5/003 |
| DE | 102014004231 A1 | 10/2014 | | |
| WO | 2008129275 A1 | 10/2008 | | |
| WO | WO-2016026673 A1 * | 2/2016 | | B62D 7/09 |

OTHER PUBLICATIONS

English Abstract of DE 102014004231 (A1).

* cited by examiner

*Primary Examiner* — Kevin Hurley
(74) *Attorney, Agent, or Firm* — Cahn & Samuels, LLP

(57) ABSTRACT

A steering system for a steerable vehicle includes at least two steerable wheels, to each of which an electrically operable steering actuator to enable the steering actuator to adjust the steering angle of the particular steerable wheel by application of a steering torque. The at least two steering actuators can be mechanically coupled to each other so that, in the event of a failure or a malfunction of the one steering actuator, the steering torque provided by the other steering actuator can be transferred to the one steering actuator, to enable the steering angle of the steerable wheel assigned to the failed steering actuator to still be changed via the other steering actuator. The at least two steering actuators can be mechanically coupled to each other via a bendable shaft or via a universal joint shaft which includes at least two rigid shafts hingedly connected via a universal joint.

13 Claims, 2 Drawing Sheets

STEERING SYSTEM FOR A STEERABLE VEHICLE

The present application claims priority to German patent document DE 10 2016 204 560.1 filed on Mar. 18, 2016 in the German Patent Office, the entirety of which is incorporated herein by reference.

FIELD OF INVENTION

The present invention relates to a steering system, in particular a steer-by-wire steering system, for a steerable vehicle, in particular a motor vehicle.

BACKGROUND OF INVENTION

In recent years, different steer-by-wire steering systems (also referred to herein, in the following, as SBW steering systems) for motor vehicles have been developed, in which a mechanical connection is no longer present between a steering wheel, which is actuated by a vehicle driver, and the steered wheels of the vehicle.

Newer concepts of SBW steering systems implement an electrically operable steering actuator for each steerable vehicle wheel, in order to enable said steering actuator to adjust the steering angle of the particular steerable wheel by application of a steering torque. This results in advantages, such as, for example, an ideal Ackermann angle under all driving conditions, which, in turn, results in less tire wear and a better tire adherence during cornering. In addition, greater play in terms of the configuration results for the placement of the individual steering actuators as compared to a conventional rack-and-pinion steering. A steering system of this type is described in DE 10 2008 039 547 A1, for example.

In order to make it possible to continue ensuring a certain steerability of the vehicle even in the event of a failure of a steering actuator, different components of the SBW steering system can be redundantly designed, i.e., in duplicate, for example. This relates not only to hardware components, such as, for example, the steering actuators themselves, an electronic control unit (ECU) which controls the steering actuators, steering torque sensors and steering angle sensors, communication paths between the individual components and the like, but also to the software which controls the SBW steering system.

In the event of a failure of a steering actuator, the steering actuator can be designed in such a way that it prevents or freely permits a rotation of the vehicle wheel. Alternatively, the steering actuator can also be designed in such a way that it permits a rotation of the steerable vehicle wheel only if a certain steering torque has been exceeded. The steering actuator which is still functioning can then, inter alia, take over the steering task of the failed steering actuator, in order to be capable of at least safely bringing the vehicle to a standstill.

In this way, the aforementioned document DE 10 2008 039 547 A1 provides, for example, that a pair of steering actuators is mechanically interconnected via a safety cable, and so, in the event of a malfunction of one steering actuator, a portion of the steering torque generated by the other, non-faulty steering actuator can be transferred to the faulty steering actuator via the safety cable, in order to allow the vehicle wheel connected to the faulty steering actuator to still be steered at least to a certain extent.

A steering system, in which the steerable front wheels and the steerable rear wheels of an automatically controlled vehicle are each steered by a separate steering actuator (one for the front axle and one for the rear axle of the vehicle), is disclosed in WO 2008/129275 A1. In order to nevertheless allow for the continued steering of the front and rear wheels of the vehicle in the event of a failure of one steering actuator, the two steering actuators can be mechanically, hydraulically, or pneumatically coupled to each other via a coupling, and so the steering actuator which is still functioning can take over the steering task of the failed steering actuator. In one exemplary embodiment, the steering actuators are designed as electric motors, wherein an output shaft of the electric motor extends to two sides of the particular steering actuator and one end of the output shaft is connected to a steering mechanism for steering the front and rear wheels, and the other end of the output shaft is connected to a coupling, via which the two steering actuators or their corresponding output shafts can be coupled to each other.

In addition, document U.S. Pat. No. 7,021,416 B2 makes known a steer-by-wire steering system which comprises a mechanical safety connection in the form of a flexible shaft between a hand grip device, which can be operated by a vehicle driver, and a rack-and-pinion steering mechanism for steering two steerable vehicle wheels. A mechanical coupling of the flexible shaft to the rack-and-pinion steering mechanism can be established with the aid of an electromagnetic coupling in the event of an electrical power failure of the SBW steering system, and so the vehicle wheels can be steered via the hand grip device in this case.

In addition, in the case of a steer-by-wire steering system for a vehicle disclosed in document US 2008/0149412 A1, a mechanical coupling can be established between a steering wheel and a steering mechanism with the aid of an electromagnetic coupling in order to steer the steerable vehicle wheels in the event of a malfunction of the SBW steering system.

Against this background, the problem addressed by the present invention is that of providing an improved steering system, in particular a steer-by-wire steering system, for a vehicle, which ensures the steerability of the vehicle, at least to a certain extent, even in the event of a technical fault in the steering system. In addition, the steering system should be designed to be extremely compact.

This problem is solved by the steering system of the present invention. It should be noted that the features mentioned individually in the following description can be combined with one another in any technically reasonable manner and can reveal further embodiments of the invention. The description additionally characterizes and specifies the invention in particular in connection with the figures.

SUMMARY OF INVENTION

According to the invention, a steering system, in particular a steer-by-wire steering system, for a steerable vehicle includes at least two steerable wheels, to each of which an electrically operable steering actuator is assigned, in order to enable said steering actuator to adjust the steering angle of the particular steerable wheel by application of a steering torque. In addition, at least two steering actuators can be mechanically coupled to each other in such a way that, in the event of a failure or a malfunction of one steering actuator, the steering torque provided by the other steering actuator can be transferred to the one steering actuator. In this way, it is intended to ensure that the steering angle of the steerable wheel assigned to the failed steering actuator can still be changed, at least to a certain extent, via the other steering actuator, in order to enable the vehicle to be safely brought to a standstill, for example, or to enable said vehicle to be moved further, at a reduced speed, at least along a certain route, in order to reach a workshop, for example.

According to the invention, the at least two steering actuators can be mechanically coupled to each other for the transfer of a torque from the one steering actuator to the other steering actuator, the steering actuators being coupled via a bendable, flexible shaft or via a universal joint shaft which includes at least two rigid shafts which are hingedly connected to each other via a universal joint. Preferably, the steering actuators are designed as electric motors, the output shafts of which can then be mechanically coupled to each other via the flexible shaft or the universal joint shaft, and so the output torque of the particular output shafts can be transferred in this way, if need be, from the one steering actuator to the other steering actuator. The steerability of the vehicle is therefore ensured, at least to a certain extent, even in the event of a technical malfunction in the steering system.

The flexible shaft and the universal joint shaft for coupling the at least two steering actuators also offer the essential advantage of a particularly installation space-saving design of the steering system. For example, the space available in an engine compartment of the vehicle, which is generally very limited, can be effectively utilized by installing the flexible shaft or the universal joint shaft in the (intermediate) spaces which are still open. In this way, the shaft can be installed, for example, around a drive engine situated between the steerable wheels, and/or around a transmission and the like, without the placement thereof being affected thereby.

Provided the available installation space permits the placement of a rigid, single-piece shaft between the steering actuators, a mechnical coupling of this type by means of a rigid, single-piece shaft for the transfer of torques between the steering actuators is also conceivable.

Further flexible, bendable mechanical couplings between the steering actuators can also be provided, alternatively, by a Bowden cable system and/or by a pure cable pull system, in which a cable pull extends from one steering actuator to another steering actuator and a further cable pull extends from the other steering actuator to the one steering actuator, and so, if need be, only one of the cable pulls is tensioned for each of two actuating directions. Both the Bowden cable system and the cable pull system can be arranged in the vehicle in a way that saves installation space by way of installing them in open (intermediate) spaces in the vehicle, in which they also extend. The cable pulls can be correspondingly flexibly placed around deflecting rollers, for example.

Alternatively, the steering actuators can also be hydraulically coupled to each other. For example, a hydraulic pump or a hydraulic cylinder can be mounted on each steering actuator, wherein a hydraulic valve, which closes in the event of a malfunction, can establish the hydraulic connection between the steering actuators. This embodiment can also be situated in the vehicle in a particularly installation space-saving manner, between the steering actuators to be connected to each other, by way of installing the corresponding connecting hydraulic line in open (intermediate) spaces in the vehicle.

According to one advantageous embodiment of the invention, the bendable shaft or the universal joint shaft has an elasticity of torsion in such a way that a usual steering angle difference, which occurs during trouble-free operation, between the mechanically intercoupled steering actuators is compensated for, in the absence of transfer, by the bendable shaft or the universal joint shaft, and a steering angle difference exceeding the usual difference effectuates a transfer of the torque between the intercoupled steering actuators. In other words, essentially no torque is transferred between the mechanically intercoupled steering actuators by the bendable shaft or the universal joint shaft during trouble-free operation even though the usual steering angle difference between the steering actuators has occurred, but, if the steering angle difference between the steering actuators exceeds the steering angle difference which usually occurs during trouble-free operation, torque is transferred between the steering actuators which are mechanically intercoupled via the bendable shaft or the universal joint shaft. In this way, the steering actuators can remain connected to the flexible shaft or the universal joint shaft both during the trouble-free operation of the steering system and in the event of a malfunction, and so an additional coupling for separating or establishing the mechanical coupling between the steering actuators does not need to be provided. As a result, both the weight as well as the manufacturing costs of the steering system can be reduced. In addition, the steering system designed in such a way requires even less installation space.

In order to establish a mechanical coupling of the steering actuators for transferring the steering actuation from one steering actuator to another steering actuator only in the event of a malfunction of the steering system, it is provided according to one further advantageous embodiment of the invention that at least one coupling is incorporated into the mechanical coupling of the steering actuators, for example, into the flexible shaft or the universal joint shaft, which is open during trouble-free operation of the steering system and closes only in the event of a malfunction. In this way, it is ensured that the mechanically intercoupled steering actuators do not influence each other during trouble-free operation of the steering system. The incorporation of the coupling into the mechanical coupling of the steering actuators can be similarly applied, to like effect, in the use of a rigid shaft, a Bowden cable system, a cable pull system as a mechanical coupling between the steering actuators, or in a hydraulic coupling of the steering actuators to each other.

According to yet another advantageous embodiment of the invention, at least one positive-fit coupling is incorporated into the mechanical coupling of the steering actuators, for example, into the bendable shaft or the universal joint shaft. In this case, the positive-fit coupling is designed for permitting a relative motion between its input side and its output side to the extent that a usual steering angle difference, which occurs during trouble-free operation of the steering system, between the mechanically intercoupled steering actuators is compensated for, in the absence of transfer, by the coupling, and a steering angle difference exceeding the usual difference brings about a positive fit of the coupling. In other words, due to the positive-fit coupling, a steering angle difference which occurs during a usual, trouble-free operation of the steering system is not transferred between the steering actuators which are mechanically coupled to each other via the coupling. Only when the steering angle difference exceeds the usual extent, such as, for example, in the event of a fault or a malfunction of the steering system, is the steering angle transferred from the one steering actuator to the other steering actuator, due to the positive fit of the coupling, which is operative in this case. The incorporation of the positive-fit coupling into the mechanical coupling can be similarly applied, to like effect, in the use of a rigid shaft, a Bowden cable system, a cable pull system as a mechanical coupling between the steering actuators, or in a hydraulic coupling of the steering actuators to each other.

According to yet another advantageous embodiment of the invention, at least one spring element is situated between the form-fitting elements of the positive-fit coupling, which allows for an elastic positive fit of the positive-fit coupling in such a way that, in the event of a positive fit of the coupling having an increasing steering-angle difference between its input side and its output side, a higher torque is transferred between the intercoupled steering actuators. This allows for a soft transition, which is gentle on material, from the non-positive-fit operating area of the coupling to the positive-fit operating area of the coupling, since the positive fit of the coupling does not abruptly engage.

According to yet another advantageous embodiment of the invention, each steering actuator can be disconnected from or connected to the bendable shaft or the universal joint shaft via a coupling assigned to said steering actuator. As a result, it can be prevented that the mechanical coupling of the steering actuators, for example, the bendable shaft or the universal joint shaft, must also be driven during trouble-free operation of the steering system. In this way, an efficient operation of the steering system can be achieved. The provision of the particular coupling at each steering actuator can be similarly applied, to like effect, in the use of a rigid shaft, a Bowden cable system, a cable pull system as a mechanical coupling between the steering actuators, or in a hydraulic coupling of the steering actuators to each other.

According to yet another advantageous embodiment of the invention, at least two steerable front wheels of the vehicle and two steerable rear wheels of the vehicle are provided, to each of which a steering actuator is assigned for adjusting the steering angle. In this case, all four steering actuators can be mechanically coupled to each other via the bendable shaft or the universal joint shaft. In this way, both the front axle steering and the rear axle steering can still be operated in the event of a malfunction or a failure of a steering actuator. This embodiment can also be similarly applied, to like effect, in the use of a rigid shaft, a Bowden cable system, a cable pull system as a mechanical coupling between the steering actuators, or in a hydraulic coupling of the steering actuators to each other.

According to yet another advantageous embodiment of the invention, each steering actuator comprises a centering spring element which brings the steering actuator into a defined starting position in the event of a malfunction. As a result, the wheel of the assigned, faulty steering actuator is held in a defined position, which further increases the safety of the vehicle operation during a malfunction of the steering system. This embodiment can also be similarly applied in the use of a universal joint shaft, a rigid shaft, a Bowden cable system, a cable pull system as a mechanical coupling between the steering actuators, or in a hydraulic coupling of the steering actuators to each other.

Further features and advantages of the invention become apparent from the following description of an exemplary embodiment of the invention, which is understood to be non-restrictive and which is explained in greater detail in the following with reference to the drawings.

BRIEF DESCRIPTION OF THE DRAWINGS

Parts having an equivalent function are always provided with the same reference numbers in the different figures, and so these are also generally only described once.

DETAILED DESCRIPTION OF INVENTION

Figure 1:
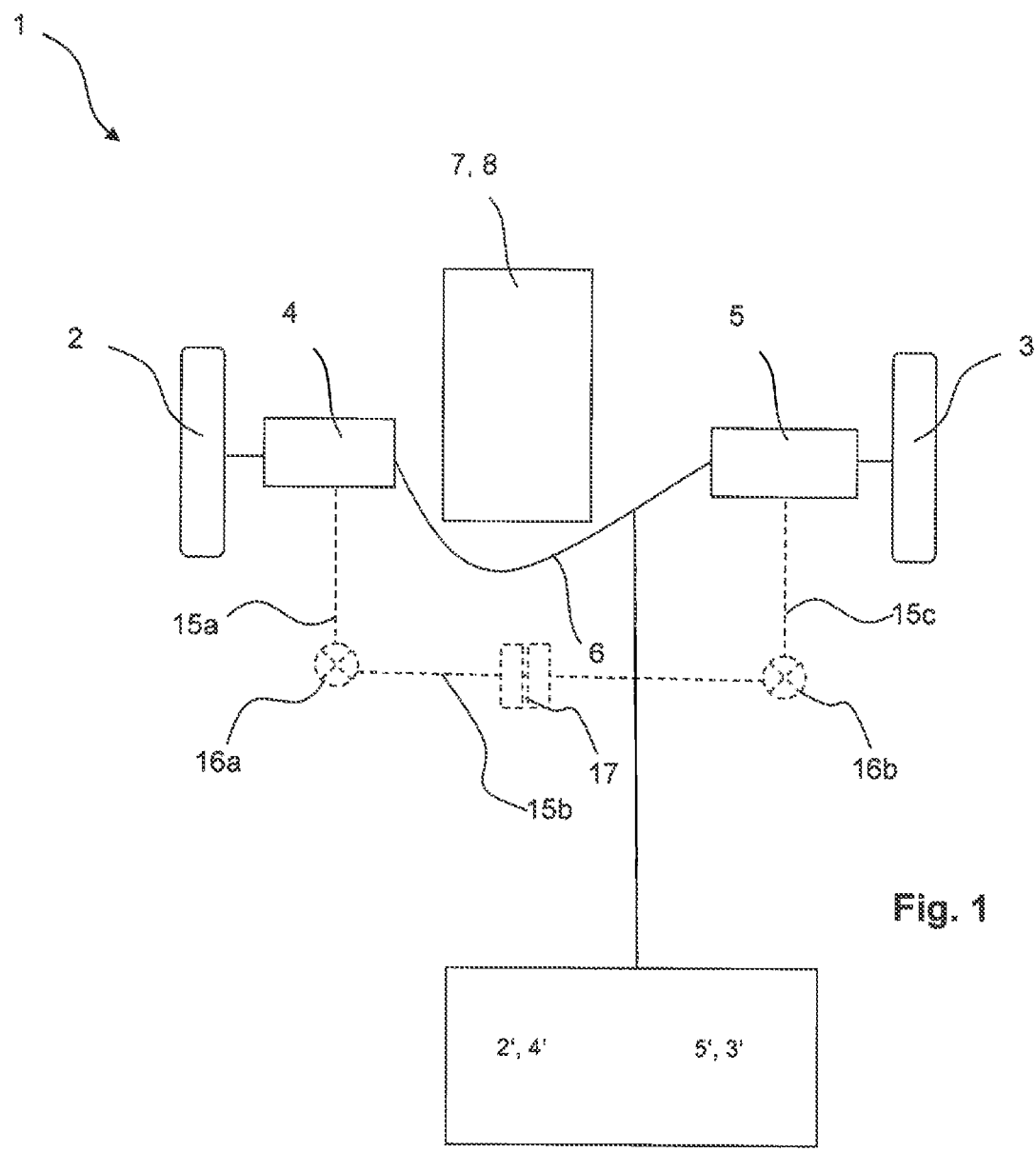
FIG. 1 shows a top view of one exemplary embodiment of a steering system according to the invention.

FIG. 1 shows a top view of one exemplary embodiment of a steering system 1 for a steerable vehicle (not shown in greater detail) according to the invention. The steering system 1 includes two steerable wheels 2 and 3. Assigned to each wheel 2 and 3 is an electrically operable steering actuator 4 and 5, respectively. The steering actuators 4 and 5 are used in a manner known per se for adjusting the steering angle of the particular steerable wheel 2 and 3, respectively, by the application of a steering torque. As is apparent in FIG. 1, the two steering actuators 4 and 5 of the steering system shown are mechanically intercoupled in this case via a bendable shaft 6 in such a way that, in the event of a failure or a malfunction of one steering actuator 4 or 5, the steering torque provided by the other steering actuator 5 or 4 can be transferred to the one steering actuator 4 or 5, respectively. In this way, the steering angle of the wheel 2 or 3 assigned to the failed steering actuator 4 or 5, respectively, can still be changed. The bendable shaft 6 is used in this case for transferring a torque from the one steering actuator 4 or 5 to the other steering actuator 5 or 4, respectively, each of which is designed as an electric motor. The steering system may include at least two steerable front wheels 2, 3 of the vehicle and two steerable rear wheels 2' 3' of the vehicle, to each of which a steering actuator (4, 5 and 4', 5') is connected for adjusting the steering angle, wherein all four steering actuators are mechanically coupled to each other via the bendable shaft or a universal joint shaft.

The particular advantage of the use of the bendable shaft 6 is that it can be placed, for example, around a drive engine 7 and/or a transmission 8 of the vehicle in a space-saving manner.

In the exemplary embodiment of the steering system 1 represented in FIG. 1, the bendable shaft 6 is statically connected to the particular steering actuators 4 and 5. The bendable shaft therefore has an elasticity of torsion in such a way that a usual steering angle difference, which occurs during trouble-free operation, between the mechanically intercoupled steering actuators 4 and 5 is compensated for, essentially in the absence of transfer, by the shaft 6, and a steering angle difference exceeding the usual difference effectuates a transfer of the torque between the intercoupled steering actuators 4 and 5.

As an alternative way for coupling, instead of bendable shaft 6, a coupling via rigid shafts 16a-c and universal joints 16a,b (in FIG. 1 shown in dashed lines) may be implemented, whereby number and geometry of rigid shafts and universal joints may vary depending on the demands for best placement of the coupling member.

An optional mechanical coupling member 17, which alternatively may be implemented also in the bendable shaft connection 6, may be controlled by an actuator (not shown) in order to rotationally connect the two steering actuators 4 and 5 only in case of failure or malfunction of one steering actuator.

Figure 2:
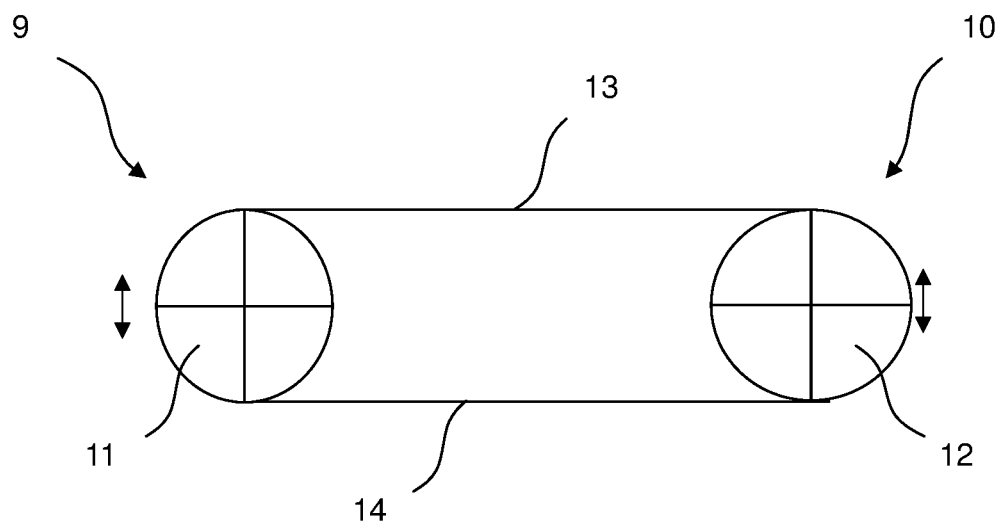
FIG. 2 shows a side view of one alternative mechanical coupling of two steering actuators.

FIG. 2 shows a side view of one alternative mechanical coupling of two steering actuators 9 and 10, wherein only the particular output shafts 11 and 12, respectively, thereof are evident. The two steering actuators 9 and 10 are mechanically intercoupled with the aid of two cable pulls 13 and 14 in such a way that only one cable pull 13 or 14 is ever tensioned upon a rotation of the output shaft 11 or 12 in either direction.

Figures 3A, 3B:
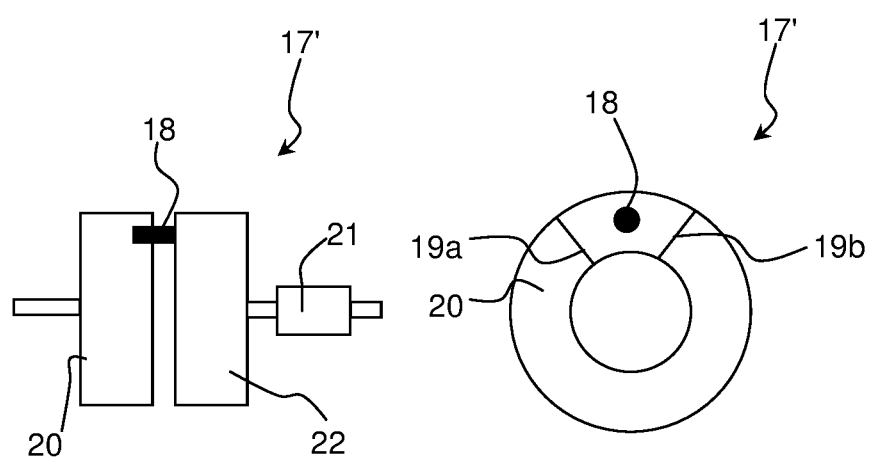
FIGS. 3a and 3b show schematic views of a positive fit mechanical coupling member.

As an alternative to a mechanical coupling to be engaged by an actuator (cf. FIG. 1), FIGS. 3a and 3b illustrate the principle of a mechanical coupling 17' which rotatively connects the actuators only if a certain angular difference is exceeded. This may be realized by a positive fit coupling 17' with a pin 18 extending from one member 22 and engaging into an annular sectional groove in another positive fit coupling member 20 which has two stops 19a,b limiting free movement of the pin 18 and thereby rotatively connections the members 20, 22 if a predetermined angular difference is exceeded.

Further, a torsional spring or a torsional elastic member 21 may be coupled into the connection so, in the event of a positive fit of the coupling, the transfer of torque between the intercoupled steering actuators 4, 5 increases with increasing steering-angle difference between input side and output side of the positive fit coupling 17'.

The above-described steering system according to the invention is not limited to the embodiment disclosed herein, but rather also comprises further, equally acting embodiments. In particular, instead of the bendable shaft, a universal joint shaft can be provided, which includes at least two rigid shafts which are hingedly connected to each other via a universal joint. The universal joint shaft can also include more than two rigid shafts which are connected to each other in series via a universal joint in each case and, in this way, allows for an even more flexible placement at the vehicle.

As mentioned above, embodiments are also conceivable which include a rigid, single-piece shaft, a Bowden cable system, a cable pull system, and hydraulics for the mechanical coupling of at least two steering actuators in a way similar to that described herein using the example of a flexible, bendable shaft or a universal joint shaft.

In one preferred embodiment, the steering system according to the invention is used as a steer-by-wire steering system in a vehicle, in particular a motor vehicle, for the steering thereof.

LIST OF REFERENCE NUMBERS

1 Steering system
2 Steerable wheel
3 Steerable wheel
4 Steering actuator
5 Steering actuator
6 Bendable shaft
7 Drive engine
8 Transmission
9 Steering actuator
10 Steering actuator
11 Output shaft
12 Output shaft
13 Cable pull
14 Cable pull
15a-c Rigid shafts
16a,b Universal joints
17,17' Mechanical couplings
18 Pin
19 Stops
20,22 Positive fit coupling members
21 Torsion spring/torsional elastic member

The invention claimed is:

1. A steering system for a steerable vehicle, comprising: at least two steerable wheels, each of which is connected to an electrically operable steering actuator to enable each electrically operable steering actuator to adjust a steering angle of a steerable wheel by application of a steering torque,
wherein the electrical operable steering actuators are mechanically coupled to each other in such a way that, in the event of a failure or a malfunction of a first steering actuator, the steering torque provided by a second steering actuator is transferred to the first steering actuator, to enable the steering angle of the steerable wheel connected to the first steering actuator to be changed via the second steering actuator,
wherein the electrically operable steering actuators are mechanically coupled to each other by a mechanical coupling comprising a bendable shaft.

2. The steering system as claimed in claim 1, wherein the bendable shaft has an elasticity of torsion such that a steering angle difference, which occurs during trouble-free operation, between the mechanically coupled steering actuators is compensated for, in the absence of transfer, by the bendable shaft, and a steering angle difference exceeding a usual difference effectuates a transfer of the torque between the mechanically coupled steering actuators.

3. The steering system as claimed in claim 1, wherein at least one coupling is incorporated into the mechanical coupling of the electrically operable steering actuators, which is open during trouble-free operation of the steering system and is closed in the event of a malfunction.

4. The steering system as claimed in claim 1, wherein at least one positive-fit coupling is incorporated into the mechanical coupling of the electrically operable steering actuators,
wherein the at least one positive-fit coupling permits a relative motion between its input side and its output side to the extent that a steering angle difference, which occurs during trouble-free operation of the steering system, between the mechanically coupled steering actuators is compensated for, in the absence of transfer, by the at least one positive-fit coupling, and a steering angle difference exceeding a usual difference brings about a positive fit of the at least one positive-fit coupling.

5. The steering system as claimed in claim 4, wherein at least one spring element is situated between form-fitting elements of the at least one positive-fit coupling, which allows for an elastic positive fit of the at least one positive-fit coupling in such a way that, in the event of a positive fit of the coupling having an increasing steering-angle difference between its input side and its output side, a higher torque is transferred between the mechanically coupled steering actuators.

6. The steering system as claimed in claim 1, wherein each steering actuator can be disconnected from or connected to the bendable shaft via a coupling.

7. The steering system as claimed in claim 1, comprising: at least two steerable front wheels of the vehicle: and
two steerable rear wheels of the vehicle, to each of which a steering actuator is connected for adjusting the steering angle,
wherein all four steering actuators are mechanically coupled to each other via the bendable shaft.

8. The steering system as claimed in claim 1, wherein each steering actuator comprises a centering spring element which brings each steering actuator into a defined starting position in the event of a malfunction.

9. A method for steering a vehicle, comprising:
providing a steering system as claimed in claim 1;
in the event of a failure or a malfunction of a first steering actuator, transferring the steering torque provided by a second steering actuator to the first steering actuator; and
enabling a steering angle of the steerable wheel connected to the first steering actuator to be changed via the second steering actuator.

10. The steering system as claimed in claim 1, wherein the bendable shaft is flexible.

11. A steering system for a steerable vehicle, comprising:
at least two steerable wheels, each wheel connected to an electrically operable steering actuator to enable each electrically operable steering actuator to adjust a steering angle of a steerable wheel by application of a steering torque,
wherein the electrically operable steering actuators are mechanically coupled to each other such that, in the event of a failure or malfunction of a first steering actuator, the steering torque provided by the second steering actuator is transferred to the first steering actuator, to enable a steering angle of the steerable wheel connected to the first steering actuator to be changed via the second steering actuator,
wherein the electrically operable steering actuators are mechanically coupled to each other for the transfer of a torque from a first steering actuator to a second steering actuator, said steering actuators having a mechanical coupling,
wherein the mechanical coupling has an elasticity of torsion such that a steering angle difference, which occurs during trouble-free operation, between the mechanically coupled steering actuators is compensated for, in the absence of transfer, by the mechanical coupling, and a steering angle difference exceeding a usual difference effectuates a transfer of the torque between the mechanically coupled steering actuators.

12. The steering system as claimed in claim 11, wherein the mechanical coupling comprises a bendable, flexible shaft.

13. The steering system as claimed in claim 11, wherein the mechanical coupling comprises a universal joint shaft having at least two rigid shafts that are hingedly connected to each other by a universal joint.

\* \* \* \* \*